March 10, 1970     R. B. FRANK     3,500,447
LIQUID SCINTILLATION COUNTING STANDARDIZATION
Filed April 11, 1966     2 Sheets-Sheet 1
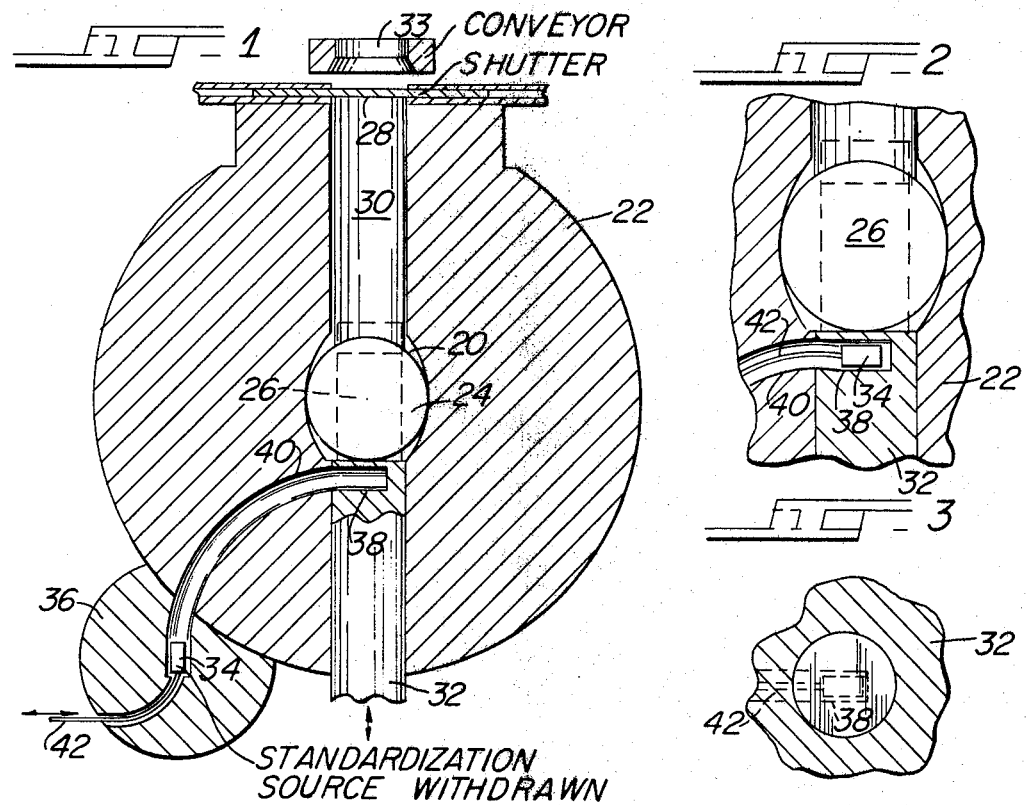
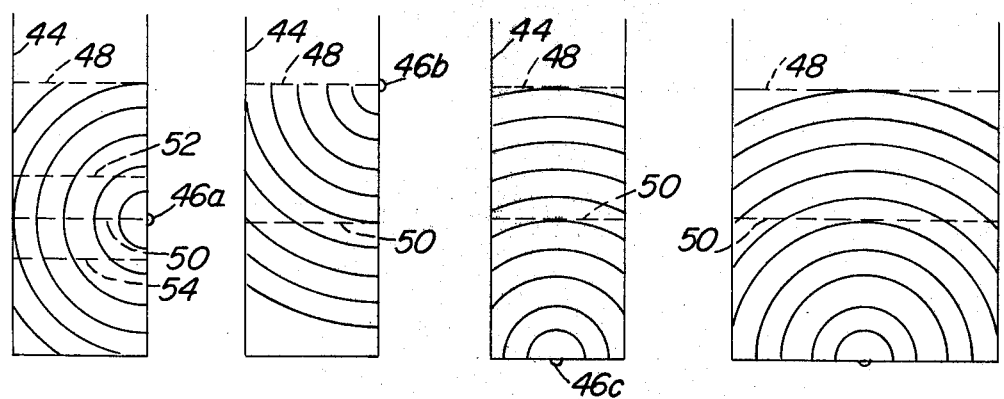
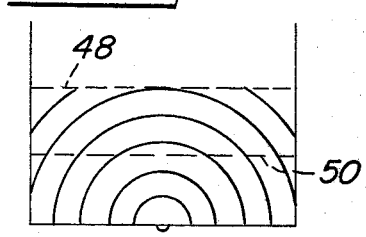
INVENTOR.
RICHARD B. FRANK

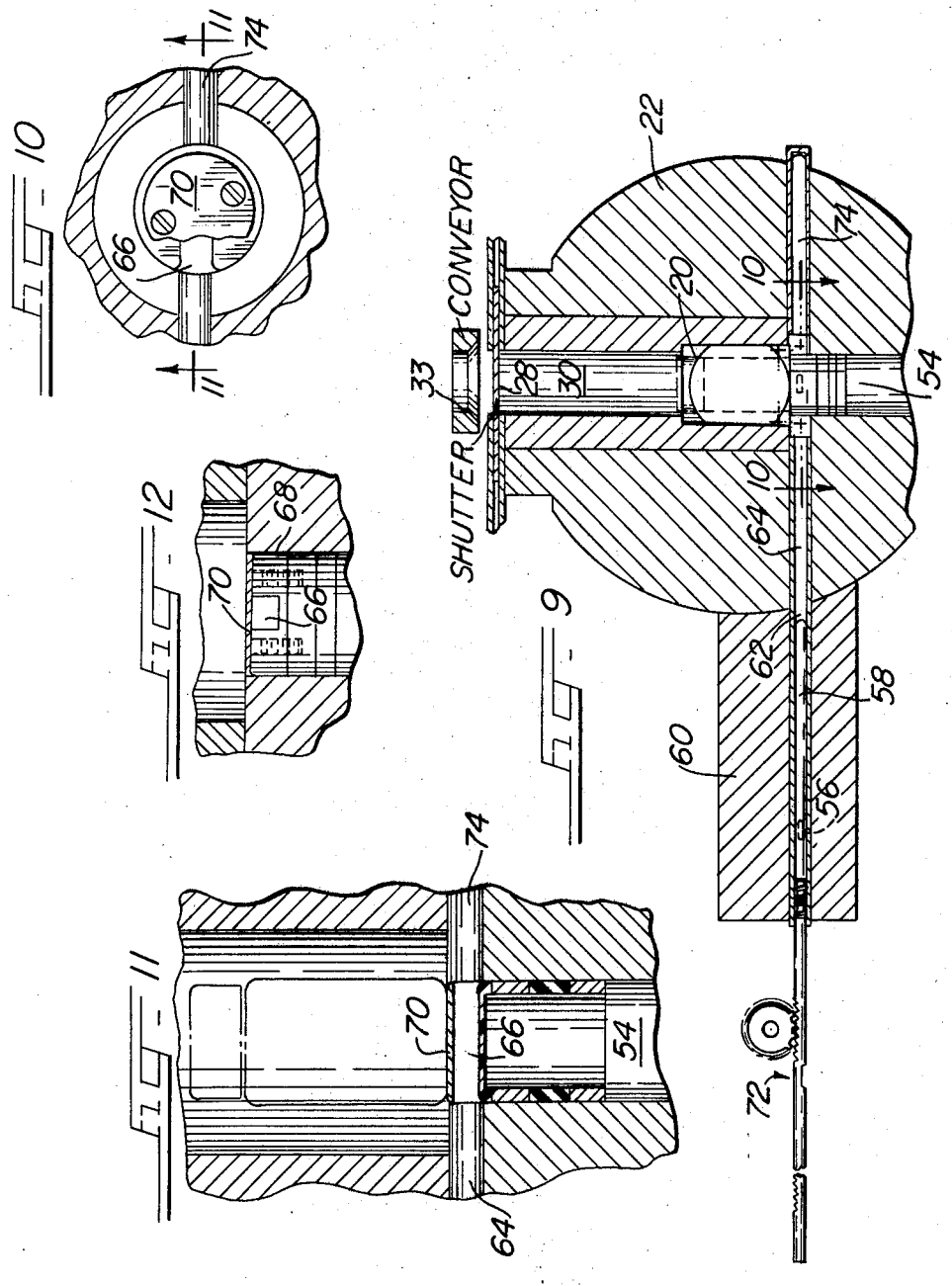

United States Patent Office 3,500,447
Patented Mar. 10, 1970

3,500,447
LIQUID SCINTILLATION COUNTING STANDARDIZATION
Richard B. Frank, Deerfield, Ill., assignor to Nuclear-Chicago Corporation, Des Plaines, Ill., a corporation of Delaware
Filed Apr. 11, 1966, Ser. No. 541,644
Int. Cl. G21h 5/00; G01t 1/20
U.S. Cl. 250—106                                   6 Claims

ABSTRACT OF THE DISCLOSURE

Counting-efficiency correction or standardization measurements on liquid scintillation samples are made by use of an external standardization source placed beneath and closely adjacent to the central portion of each sample. Problem of inaccuracy due to inexactness of the level of filling, inexactness of the positioning, and similar variations in successive sample vials are greatly reduced as compared with other source placements. An automatic liquid scintillation system employing this location of an external-standardization gamma-ray source is described.

---

This invention relates to the standardization of samples in liquid scintillation counting and more particularly to an improved method and apparatus for measuring the efficiency of counting of successive samples in an automatic sample changer to permit correction of the successive measurements for differences in efficiency produced by variation of sample composition, employing the radiation from an external standard source for efficiency measurement.

Liquid scintillation counting is now in widespread use for a variety of scientific and other laboratory purposes, particularly in medical and biological research. The principles and practices in such measurements are well known, and need to be described only briefly for understanding of the present invention. The general principle of this type of radiation counting is similar to that of radiation counting employing a solid scintillator, the difference lying primarily in the direct disposition of the emitter of radiation homogeneously in the scintillator. An important difference which results from this, as is well know, is that the counting efficiency of the scintillator is inherently altered by the sample, in a variety of ways collectively referred to as "quenching," a term in common use to describe any of the various phenomena by which the light pulses emitted from the sample vial are reduced compared to their amplitudes which would be produced by radiations of the same energy distribution in the pure scintillation counting solution (although the term "quench" is also sometimes applied to any of the phenomena or characteristics of the pure scintillation-counting liquid itself which result in the imperfect transfer of the energy of the particle or radiation absorbed in the liquid to light energy emitted from the vial). Because of the variation in quenching from sample to sample, it has been customary at all times, when accuracy of measurement is important, to standardize or correct measurements. The most direct standardization is given by making a second measurement after addition of a known quantity of the same isotope as the one under measurement. For example, when the isotope under measurement is tritium, and the count has been recorded, a standard sample of tritium may be introduced in a suitable form, a second measurement made, and the amount of the increment used as an indicator of the quenching or efficiency factor for the particular sample. This is in essence a type of standardization in which the correction is (neglecting factors such as changes of coincidence loss) merely a matter of computation of ratio.

The direct method of standardization just described, usually implied by use of the term "internal standardization," is relatively impractical for many routine counting measurements, and a variety of indirect or secondary standardization methods have been devised in recent years employing as indicators of the efficiency of a given sample count other measurements which are sufficiently correlated with actual efficiency to give meaningful correction information from suitable calibration or correlation charts prepared by use of samples of known content and efficiency. These may be roughly divided into methods which detect and measure shifts in relative amplitudes in the pulse-amplitude spectrum of the sample measurement, and methods employing auxiliary standardizing sources which are not sufficiently simulative of the radiation under measurement to permit direct extrapolation of efficiency. The present invention relates to the latter type of standardization procedure and apparatus for its practice.

Experimenters found some years ago that standardization may be accomplished with an external source of gamma radiation, producing Compton electrons in the scintillating liquid, with a spectrum sufficiently resembling a beta radiation spectrum so that a calibration curve type of standardization of measurements on internal beta samples may be made without the necessity of inserting a standard sample in each vial, as is required for a beta-emitting standard. With such a standardizing source, the measuring system is calibrated for any type of sample in terms of efficiency by preparation of a series of compositions of known activity but of varying quench (i.e., producing varying counting rates for the same known activity) and a calibration curve is made relating the required sample correction factor to the counting rate produced by the external source in a standard position outside the vial, in a selected range of pulse-heights (the same range or channel as is used for the sample count or a separate range) appearing at the output of the photomultiplier detector. With calibration curves thus prepared, the count for each unknown sample under measurement may be corrected for differences in quenching by bringing the standard source from a shielded remote location to the standard position and observing the count produced in the standardizing channel.

The simplicity of the employment of an external standardization source is particularly desirable for the counting of large numbers of samples such as in the case of the large-capacity automatic systems which have been commercially made for a number of years. The making of the standardization count by merely bringing up the standard source to the vial permits the standardizing measurement to be made without manipulation or disturbance of the sample. The external source type of standardization has numerous advantages both in the manual or non-automatic making of measurements and in automatic measuring equipment, but is particularly useful in the latter type of equipment, where there is presently no practical way available of introducing an internal standard without manual intervention by an operator, and where the necessary movements of the standard source and standardizing count are readily incorporated in the motor-driven and programming portions of the systems which have long been well known.

The present invention stems from the recognition that a number of problems which previously limited the practical accuracy of external standardization of samples may be solved in a simple manner. The two most serious limitations on the utility of the external standardization method are found to lie in sources of inaccuracy which do not exist in the case of internal standardization as heretofore commonly used. First, a vital difference between internal and external standardization lies in the relation between the volume of liquid in the sample vial and the count obtained from the standardizing source. In the case of the dissolved internal standard, the variation of counting rate from a standard source with exact level of the scintillating liquid in the standard vials employed for such measurements is negligible. In the case of the external gamma source, however, it will be seen that the number of counts may (except for the factors to be discussed later) be expected to be fairly proportional to the height of the liquid in the cylindrical vial. Accordingly, complete accuracy of the standardizing measurement relies on exact accuracy of the level of filling of the vial. When large numbers of vials are prepared by technicians, as is customary in modern uses of automatic equipment, an approach to theoretical accuracy of filling level is essentially completely impractical.

The second problem limiting the practical accuracy of the external standardization method prior to the present invention lay in the variation of the standardizing count with exact relative positioning of the standardizing source and the vial. From the practical aspect, it is necessary that the source be located very close to the vial, in order that usably high counting rates be obtained with the small source sizes which may be incorporated in such equipment without creating great hazard in the event of accidental exposure of personnel. With practice of the method in manners known prior to the present invention, any variation of exact relative positioning of the standardizing source and the sample vial produced a great change in the scintillation response. In automatic equipment prior to the present invention, this necessity for exactness of relative positioning was met by attempting to design the equipment for completely identical absolute positions of the successive sample vials, on the one hand, and of the stopping-place of the source in each insertion, on the other hand. Reproduction of the positioning of the source in each cycle of its use of course does not present a very great problem, mere use of mechanical precision sufficing for the purpose. As regards the sample vial, however, the exactness of reproduction of positioning is substantially more difficult when practical problems are considered, as will be further discussed hereinafter. With manners of practicing the method of external standardization heretofore known, not only has the precision of the standardization been subject to the precision of positioning of each sample vial, but in addition the relative location of the source and the vial has been such that it was practically necessary to accept substantial errors in the precision of the standardization of samples in order to avoid impractically intricate sample-handling mechanisms, on the one hand, or impractically low tolerance for variations in sample vials, on the other hand.

Automatic liquid scintillation counting systems now in common use generally support the sample bottle under measurement on top of an elevator or ram, each sample being placed on the ram or elevator when it is in its elevated position and then lowered into the light-sealed and radiation-shielded counting chamber wherein the scintillations are detected by the photomultiplier. In utilization of the external standardization method heretofore made, the standardizing source is brought to a position adjacent to the side of the bottle. Any variation of exact positioning of the vial or bottle on the elevator of course produces a change in distance of the source from the bottle and accordingly alters the standardizing count. Prior to the present invention, this inherent error appears to have been accepted as a limitation of accuracy in using external standardization of liquid scintillation samples in automatic equipment. It being obvious that the magnitude of the error can be reduced by increasing the distance from the source to the vial to make the position variation relatively smaller, the error may be reduced in this manner, but at the expense of greatly reducing the counting rate obtainable from any given size source.

The present invention results from the discovery, based upon study and analysis, that the two serious sources of error in automatic external standardization of samples as known before the invention may be greatly reduced, and indeed virtually eliminated as limitations on accuracy, by a very simple change in the method and apparatus heretofore employed. It has been found from theoretical considerations, and fully verified by experiment, that simply changing the location of the standard source so that it is immediately beneath the center of each sample vial not only substantially eliminates concern about error tolerance in horizontal positioning of the vial, but enormously reduces errors caused by normal variations of level of filling of the sample vial about an intended level used in sample preparation, and indeed permits the intermixing of samples varying in level by a considerable factor without introducing error which is excessive for many purposes. As a concomitant of the elimination of the criticality of horizontal position, the present location of the standardizing source greatly reduces the effect of diameter of the vial on the accuracy of the standardization.

As may be observed, the placing of the standardizing source beneath the vial in essence replaces high sensitivity to horizontal spacing error by high sensitivity to vertical spacing error. However, the maintenance of exactly reproducible spacing in the vertical direction is a relatively simple matter, since each sample rests on the same surface, and precision of placement of the sample adjacent to this surface is the sole precision required for error-free reproduction of vertical spacing.

As to relative horizontal orientation, the bottom central source location makes the scintillation response to the source relatively insensitive to slight lateral changes in placement of the vial. The importance of this advantage does not lie solely in avoiding added requirements for precision of the sample-handling mechanism, but also in making it unnecessary to impose the restrictions on exact outer bottle or vial diameter and shape required for precision in horizontal positioning. Bottles or vials used in conventional liquid scintillation counting systems have long been standardized in shape and dimensions and are of a type made by a number of manufactureres with generally identical dimensions. However, the number of such vials used in a laboratory with modern liquid scintillation equipment is large, and economic considerations make it undesirable to require extremely rigid tolerances in manufacture of such vials. Accordingly, practical sample-handling equipment is normally designed to accept small variations of vial configuration, limited only by effects on efficiency of counting. The present invention permits the use of external standardization with high accuracy without introducing extra requirements on the sample-handling mechanism or limitations on vial configuration. In the same connection, it will be noted that where the invention is used with an elevator sample support which also serves to fix the source position, the standardization position or geometry is essentially unaffected by slight deviations in elevator position.

The basic teachings and advantages of the invention may be understood to a considerable degree from the discussion already presented. Certain aspects of the theory, however, are illustrated in the drawing and described below, together with particular embodiments as required by the patent laws.

In the drawing:

FIGURE 1 is a more or less schematic cross-sectional view of an automatic liquid scintillation counting device utilizing the invention;

FIGURE 2 is an enlarged fragmentary sectional view of the top portion of an elevator or sample-support ram constituting a portion of the device of FIGURE 1, showing the location of an external standardization radiation source in accordance with the invention;

FIGURE 3 is a top plan view of the elevator of FIGURE 2;

FIGURE 4 is a schematic illustration of the radiation flux pattern produced in a liquid scintillation vial by an external standardization source positioned in a general manner heretofore used;

FIGURE 5 is similar to FIGURE 4, with a modified source location of the type heretofore used;

FIGURE 6 is a generally similar view, but showing the source located in accordance with the present invention;

FIGURE 7 is generally similar to FIGURE 6, but illustrating the phenomena in a container of modified relative dimensions;

FIGURE 8 is again similar to FIGURES 6 and 7, but with further modification of the relative dimensions of the illustrated container;

FIGURE 9 is generally similar to FIGURE 1, but illustrates a modified form constituting a commercial embodiment of the invention including certain improvements of other persons;

FIGURE 10 is an enlarged fragmentary view, partially in section and partially in elevation, taken along the line 10—10 of FIGURE 9;

FIGURE 11 is a vertical sectional view taken along the line 11—11 of FIGURE 10; and FIGURE 12 is a side elevational view of the top of the elevator in this embodiment.

FIGURES 1 through 3 schematically illustrate the invention as applied to liquid scintillation counting equipment of the type which is now well known, and is accordingly illustrated only in rudimentary fashion. The counting chamber 20 is heavily shielded by a generally spherical shield 22. Photomultipliers 24 oppositely disposed in the chamber serve as transducers for the scintillations occurring in the sample vial or bottle 26. A shutter 28 excludes the entry of light through a vertical passage 30 employed for introduction and removal of sample vials. The sample is disposed on the top end of an elevator or ram 32. A conveyor 33 slides successive samples onto the elevator when the latter is in the raised position (not shown), each being then lowered into the counting chamber.

The mechanism for raising and lowering the elevator, the controls for cycling operation, the manner in which sample-changing is accomplished without admission of light into the chamber, and similar details are omitted in the schematic illustration of the drawing, being irrelevant to the present invention, a variety of such structures being incorporated in commercial equipment of the general type illustrated.

The provision for standardization of samples employs a gamma-ray source 34 encased in an auxiliary shield 36. The topmost portion of the elevator 32 has a radial bore 38 which receives the source 34 in exactly centered position. The source enters the bore through an appropriate aperture 40 in the main shield 22, the inner end of this aperture registering with the bore 38 in the elevator when the latter is in the lowered position. In the schematic illustration of FIGURE 1, the aperture or passage 40 is shown as curving outwardly and downwardly and terminating at the center of the auxiliary shield 36, the storage position of the source 34. It will be understood that this representation is more or less diagrammatic in showing the degree of shielding of the chamber 20 from the source 34 when the source is withdrawn. As will be obvious to those skilled in the art, actual practice of the external standardization method with samples of the low counting rates for which modern commercial equipment is designed requires better shielding of the withdrawn source from the counting chamber than is here schematically illustrated, since the conceptually simple curved open passage shown would produce substantial background in the counting chamber by scattering. The actual high degree of isolation of the withdrawn source from the counting chamber may be accomplished in any desired manner. The necessity for a higher degree of shielding than that here schematically illustrated is achieved in a variety of well-known ways, any of which (including the relatively cumbersome type of provision described by Higashimura in International Journal of Applied Radiation and Isotopes, 1962, vol. 13, page 308, where successful use of the general method was first reported) may of course be used in connection with the present invention. Likewise, it will be recognized that the illustration of a cable or wire 42 extending out through the shield 36 and attached to the source to move it between its two positions is again merely schematic and suggestive of the variety of mechanisms which may be used, the invention in its broader aspects being capable of being practiced manually, if desired, with the source on the end of a rod or wand inserted through a suitable aperture in the shield surrounding the chamber.

It is important to the most advantageous practice of the invention that the standardizing source, when in the position of use, be closely adjacent to the surface upon which the sample vial is supported, the upper surface of the elevator in the illustrated embodiment. The advantage of this in connection with maximizing the sample response to any given source size will of course be obvious. However, such closeness to the bottom of the vial has further advantages in connection with the minimizing of variations of scintillation response with variations of liquid level, as will become apparent from the discussion of the diagrams which appear in the drawing as FIGURES 4 through 8.

In FIGURES 4 through 8 are shown the radiation flux patterns produced in the liquid within a container under various conditions of source orientation and container configuration. In these figures, the source is illustrated as being located essentially in contact with the outer boundary of the liquid. It will of course be recognized that such illustration is merely for conceptual clarity in understanding of the principles involved, and that the positions illustrated are accordingly idealized as compared to actual practice. Similarly, portrayal of the source as a "point" is a slight departure from actual conditions; however, such a portrayal is fully adequate for all practical purposes, the actual size of the radiating source normally being very small compared to any other dimensions involved. (It will of course be understood that the "source" 34 illustrated in the drawing is a metal capsule having radioactive material in a small central region.)

FIGURES 4, 5 and 6 schematically show a sample vial 44 with the same upper liquid level of content, but with three different orientations of the standardizing source, designated 46a, 46b, and 46c in the three respective views. The concentric arcs shown represent what may be called "equiflux" lines at regular radial intervals from the source. These schematic diagrams are of course two-dimensional, being representative of only a diametral plane of the circular tubular vial, and accordingly may not be interpreted quantitatively in evaluating the actual or relative results achieved in practice, particularly as regards the asymmetrical locations of the source in FIGURES 4 and 5, where the extrapolation to planes not including the source becomes difficult. However, both calculations and experiment demonstrate that the plane representation of these figures adequately demonstrates the principles involved in the superiority of the present invention, represented by FIGURE 6, over prior art source locations, represented in FIGURES 4 and 5, as regards relative independence, in the standardizing measurement, of variations of exact position of the vial and exact level of liquid in the vial.

As a preliminary matter, it is to be pointed out that to a first approximation, the sizes of sample vials, coupled with the nature of the contents (virually never materials of high atomic number, and accordingly virtually never of high electron density), are such that the attenuation for gamma rays is extremely small, the scintillations produced representing a minuscule efficiency for counting of gamma rays. To this first approximation, accordingly, the liquid produces no substantial effect on the gamma ray flux pattern. Accordingly, if such a vial is irradiated in a uniform or random flux fie'd, the number of scintillations produced in the liquid will vary in simple direct proportion to the volume, i.e., to the height of the liquid level in the cylindrical container. Obviously, no practical source location produces such a result, but such proportionality serves a useful purpose as a reference performance for showing the superiority of the source placement or geometry of the present invention as compared with the prior art as regards relative independence of liquid level. (Since such a field is by definition position-independent, it serves no analogous purpose in comparing practical geometries as regards this respect.)

FIGURE 4 shows a typical geometry heretofore employed in external standardization of samples. The source 46a is adjacent to the side of the liquid, at a level approximately one-third the height of the vial. In FIGURE 5, the source 46b is similarly located, except at twice the height. In FIGURE 6, the source 46c is centered at the bottom of the container, in accordance with the invention.

Comparison of the three geometries as regards sensitivity to level and position may be made by study of the equiflux lines produced by the sources in the illustrated positions.

Because of the actual three-dimensional character of the occurrences, it will be desirable to refer to "solid angles," "volumes" and similar quantities in connection with the illustrations, even though equating the planes illustrated to volumes, or the angles illustrated to solid angles, is obviously an extreme approximation in the cases of FIGURES 4 and 5, where the equiflux patterns differ in each vertical plane across a diameter of the container. It will be found on analysis, however, that the error introduced by comparing the two-dimensional representations as three-dimensional is actually in the direction of understatement of the extent of the advantages of the present invention, as will be briefly explained later.

In each of these drawings, a dotted line 48 indicates a liquid level representative of about two-thirds of the capacity of the vial, representing one typical counting condition. In each case there is also a second dotted line 50 representing half of that filling. Obviously, such a volume ratio is not to be expected as an error variation in highly accurate measurements. However, not only is such a large ratio convenient for purposes of explanation, but it will be seen that the present invention has important advantages flowing from the encountering of different practices as to sample volumes counted.

The scintillation response of the liquid may be derived qualitatively from the diagrams by observing that the equiflux lines divide the liquid into zones which may be considered to have equal averaged flux (irradiation per unit volume). It will be observed upon study that with the zones being of equal "thickness" (as viewed from the source), the scintillation response in each zone in the liquid is a function solely of the solid angle from the source subtended by that zone. Accordingly, equal scintillation response is produced in each zone within the portion limited by any given angle subtended from the source. The variation of scintillation rate with level may be seen qualitatively by approximation from this relation, i.e., the percentage count change for any given percentage level change may thus be visualized for comparative purposes.

As earlier indicated, proportionality to sample volume (uniform flux) represents a useful standard of comparison. As shown in FIGURES 4 through 6, the variation of count rate with volume change is highly dependent on source placement, and, for small changes in volume, additionally dependent on the region of volume in which the variation occurs.

The vast superiority of the present invention (FIGURE 6) under all conditions will be apparent from study of the three diagrams.

Considering FIGURE 4, which has the source 46a approximately one-third the way up the bottle, it will be seen that doubling of the volume of liquid (liquid level 50 at the height of the source and liquid level 48 at twice this height) produces doubling of the scintillations, the added zones being a symmetrical reflection of the pre-existing zones. The same increase of volume in FIGURE 6 produces only a relatively small change of scintillation rate.

For smaller variations in volume, the corresponding variation in counting rate changes radically with the region of intended filling in the case of the geometry of FIGURE 4. There are there shown additional levels 52 and 54 representing variations about a nominal or intended level of filling at 50. As will there be seen, the sensitivity to liquid level in this region is substantially greater than mere proportionality to volume. In this case, the two-dimensional showing of the drawing is substantially inadequate to shown the change, as will be seen by recognizing that sectional views through the vial and the source in other planes than the diametral plane illustrated would differ only in that the horizontal dimension would be diminished. In the case of nominal or intended filling to this level, any errors in filling level produce substantial multiples in the corresponding error in counting rate produced by the standard source. Variations about a mean or intended level at 48 produce much smaller variations in counting rate. However, these variations remain much larger than those produced in FIGURE 6.

As will also be observed, the geometry of FIGURE 4 is highly sensitive to change of spacing between the vial and the source. In practice, of course, the source 46a cannot in any event be placed in the intimate contact with the liquid shown, and the actual spacing is necessarily appreciable. Accordingly, the conditions assumed in this figure slightly exaggerate the variation of response with lateral motion (non-uniformity of position) of the vial. However, it will be obvious that extremely accurate positioning is required. In the case of the construction of FIGURE 6, the deviation of response produced by slight lateral displacement is comparatively negligible.

The volume-dependence of the count rate at the level shown at 50 in FIGURE 4 renders the use of such a level of filling highly impractical where extremely accurate standardization is wanted, particularly where large numbers of samples are being prepared. The sensitivity to level or volume error is high near the source level irrespective of the height of the latter. In FIGURE 5, the source 46b is placed higher, and the high degree of level sensitivity accordingly occurs in this region. As regards use of this geometry with the partial or lower level illustrated at 50, the level sensitivity is of course smaller, but the source utilization is poor. It will be noted that obtaining low level-sensitivity at 50 by upward removal of source 46b, although representing a large improvement as compared with FIGURE 4, can never produce a counting rate change less than proportional to the volume change, since further increase of distance of the source from the liquid merely approaches the condition of uniform irradiation.

For purposes of further understanding of the operation and advantages of the invention, FIGURES 7 and 8 illustrate configurations in which the bottom central source location is used with bodies of liquid scintillator departing in shape from FIGURES 4 through 6 and common liquid scintillation counting practice. In FIGURE 7, the filling levels are shown at 48 and 50 as previously, but in a container of twice the diameter. It will be recognized that this actually corresponds to a large degree to the condition which would obtain in FIGURE 6 at levels half of those illustrated in FIGURE 6. It will be seen from FIGURE 7 that the desirable characteristics are similar to those already discussed in connection with FIGURE 6. Likewise, the basic operation remains when the relative dimensions are further altered, as in FIGURE 8. However, when similar analysis (not illustrated) is made of these altered shapes with the source placed on a side, as in FIGURES 4 or 5, the relative disadvantage as compared to the present system is greatly reduced. The reason may be seen by comparison of the effects of doubling of volume (raising the level from 50 to 48) in FIGURES 6, 7 and 8 (considering the latter as being of the same vertical dimensions as the others, for purposes of the comparison). It will be seen that the percentage variation of scintillation response with volume, for doubling of the volume, is successively higher in the three figures. On the other hand, if the source were on the side at level 50 in FIGURES 7 and 8, the doubling of the response would still remain. It may thus be seen that the present invention has its greatest advantage where the scintillation sample is of a height at least equal to its horizontal dimension.

For purposes of completeness, there are shown in FIGURES 9 through 12 the essential features of a commercial construction of equipment made in accordance with the invention, embodying improvements on the basic construction constituting the invention of others, and more fully described and claimed in the co-pending application of Raymond L. Meeder and Joseph E. Kus, Ser. No. 541,767, filed Apr. 11, 1966.

The portions of the overall construction which are the same as those previously described are indicated in the drawing by the same reference characters as in FIGURE 1, and those portions of the device which are common to both constructions are not further described. In this construction, the elevator 54 receives the source 56 as previously. However, the source is in this construction attached to the back end of a shield rod 58 of a suitable shielding material such as a tungsten alloy. In the withdrawn position (illustrated) the assembly of the source and shield rod is seated in an auxiliary shield 60, having a straight central aperture 62 aligned with the aperture 64 in the main shield 22 used for transporting the source into the counting region. In the withdrawn position, the source is highly shielded from the region adjacent the counting chamber by the rod 58.

The elevator 54 has an opening 66 receiving the source as previously described, but in this case the opening extends entirely through the elevator to pass the shield rod 58.

The opening 66 extending laterally through the top of the elevator is formed by a groove of rectangular shape across the top of a cap 68 secured to the top of the elevator ram. A very thin cover 70 is attached to the top of this assembly, and preferably has a highly polished upper surface, as is customary practice in minimizing light absorption in the counting chamber. As more fully described in the co-pending application mentioned, the dimensions of the opening 66 are matched to those of the rod 58 in such a manner that the vertical spacing of the source and the supported sample vial is tightly and reliably fixed.

The assembly of source 56 and shield rod 58 is driven by a rack and pinion 72. When the source is in place for standardizing the efficiency of a measurement, the shield rod 58 is seated in an aperture 74 constituting an extension of the aperture 64. In this position, the shield rod 58 serves to shield the exterior from the source 56.

Obviously, the particular embodiments illustrated are in no sense limitative of the variety of manners in which the invention may be practiced. As earlier pointed out, not only may the invention be practiced with any form of automatic or semi-automatic equipment, with which its advantages are particularly great, but also it may be used manually. The scope of the protection to be given the invention should accordingly be determined from the descriptions or definitions thereof in the appended claims, and equivalents.

What is claimed is:
1. In liquid scintillation counting apparatus having:
 (a) a chamber having a sample station adapted to receive successive liquid scintillation samples in transparent containers of height substantially greater than transverse dimensions,
 (b) photosensitive means for detecting scintillations occurring in the samples,
 (c) means for inserting and removing successive samples into and from the chamber,
 (d) a standard source of radiation of the type adapted to traverse the wall of a sample container externally irradiated thereby to produce scintillations in the liquid therein,
 (e) and means for subjecting a sample at the station to external radiations from the standard source to produce scintillations in the sample, the improved construction characterized by:
 (f) the standard source being beneath and closely adjacent to the central portion of the bottom of the container when the sample is subjected to its radiation.

2. The counting apparatus of claim 1 characterized by:
 (g) the sample station being a sample support portion of a vertically reciprocable elevator having a counting position wherein a sample thereon is in the chamber, and the means for subjecting a sample to the radiations of the standard source comprising a lateral opening in the elevator below and adjacent to the sample support portion, and means for selectively inserting and removing the standard source into and from the opening when the elevator is in the counting position.

3. In the method of producing an indication of the scintillation response of a liquid scintillation composition in a container comprising exposing the container to an external standard radiation source adapted to produce scintillations by absorption of the standard radiations in the liquid and producing an indication of the scintllations produced in the composition in response to the standard source, the improvement wherein the standard source is placed closely adjacent to and externally of the central portion of the bottom of the container, so that the variation of the number of scintillations produced in response to the standard source with variation of liquid level and variation of lateral position is minimized.

4. The method of claim 3 wherein the container is of a height substantially greater than its transverse dimensions.

5. The method of claim 4 wherein the container is of vertically elongated circular cylindrical shape.

6. The method of claim 3 wherein the source is a gamma source.

References Cited

UNITED STATES PATENTS 3,188,468    6/1965    Packard.

RALPH G. NILSON, Primary Examiner

A. B. CROFT, Assistant Examiner

U.S. Cl. X.R.,
250—71.5, 108